(12) United States Patent
Plantan et al.

(10) Patent No.: US 8,453,556 B2
(45) Date of Patent: Jun. 4, 2013

(54) NON-THREADED METHOD FOR ASSEMBLING A CENTER HOLE PARKING DIAPHRAGM AND ADAPTER PUSH ROD WITH A CLIP AND WASHER

(75) Inventors: Ronald S. Plantan, Elyria, OH (US);
Mark J. Kromer, Huron, OH (US);
Brett S. Darner, Wellington, OH (US);
Kevin Carlson, Kerman, CA (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 705 days.

(21) Appl. No.: 12/723,337

(22) Filed: Mar. 12, 2010

(65) Prior Publication Data
US 2011/0219946 A1   Sep. 15, 2011

(51) Int. Cl.
*F15B 15/10* (2006.01)
*B60T 17/00* (2006.01)

(52) U.S. Cl.
USPC .................................................. 92/63; 92/99

(58) Field of Classification Search
USPC ..................................... 92/63, 99, 100, 130 A
See application file for complete search history.

(56) References Cited

U.S. PATENT DOCUMENTS

| | | | |
|---|---|---|---|
| 2,578,730 A | 12/1951 | Nicholson et al. | |
| 3,020,094 A | 2/1962 | Murty et al. | |
| 3,101,219 A | 8/1963 | Herrera | |
| 3,175,473 A | 3/1965 | Boteler et al. | |
| 3,244,079 A | 4/1966 | Herrera | |
| 3,581,627 A | 6/1971 | Campanini | |
| 3,656,410 A | 4/1972 | Trower | |
| 3,696,711 A | 10/1972 | Berg et al. | |
| 3,926,094 A * | 12/1975 | Kurichh et al. | 92/63 |
| 5,105,727 A | 4/1992 | Bowyer | |
| 5,345,858 A | 9/1994 | Pierce | |
| 5,377,579 A | 1/1995 | Pierce | |
| 5,507,217 A * | 4/1996 | Plantan | 92/63 |
| 5,640,893 A | 6/1997 | Stojic | |
| 5,937,733 A | 8/1999 | Stojic | |
| 6,164,187 A | 12/2000 | Stojic | |
| 6,349,629 B1 * | 2/2002 | Plantan et al. | 92/99 |
| 6,360,649 B1 | 3/2002 | Plantan | |
| 7,506,573 B2 | 3/2009 | Scheckelhoff et al. | |
| 8,342,076 B2 * | 1/2013 | Prager et al. | 92/63 |
| 2007/0034465 A1 | 2/2007 | Thompson et al. | |

OTHER PUBLICATIONS

"Haldex Life Seal Actuators Deliver Reliability, Long Life and Value", Haldex, L20438, Rev. 2/08, six (6) pages, www.haldex.com.

* cited by examiner

*Primary Examiner* — Thomas E Lazo
(74) *Attorney, Agent, or Firm* — Crowell & Moring LLP (57) ABSTRACT

A brake actuator having a plurality of actuator housing portions includes a diaphragm seal partially delimiting a parking brake de-actuation chamber and retained between adjacent portions of the housing. To produce brake actuation upon depressurization of the parking brake de-actuation chamber, a push rod extends into and out of a service brake actuation chamber upon release of fluid pressure from and supply of fluid pressure to the chamber. A clip or similar element receivable over the end section of the push rod is securable on the end section to compress the diaphragm seal axially relative to the push rod against a seat carried by the push rod while permitting a radial inner edge of the diaphragm seal to remain spaced from an outer surface of the end section.

20 Claims, 5 Drawing Sheets

NON-THREADED METHOD FOR ASSEMBLING A CENTER HOLE PARKING DIAPHRAGM AND ADAPTER PUSH ROD WITH A CLIP AND WASHER

BACKGROUND OF THE INVENTION

1. Field of the Invention

A brake actuator arrangement includes a spring brake assembly utilizing a diaphragm with a central aperture and a push rod that goes through the aperture. The arrangement has a particular non-threaded securing device holding a central part of the diaphragm on the push rod.

2. Description of Related Art

A return spring is conventionally used in an air brake actuation device to bias an adapter push rod assembly into a nesting feature on a parking diaphragm while the parking side of the actuator is pressurized. Such an arrangement is intended to reduce negative effects of vibration on a center seal. The force of a return spring must be overcome during parking; this characteristic essentially equates to internal losses of the unit. The power spring, accordingly, must be large to overcome this return spring force and allow for adequate parking.

In a brochure titled *Haldex LIFE SEAL Actuators Deliver Reliability, Long Life and Value* (L20438; Rev. 2/08), a center-hole parking diaphragm held together with a threaded member is described. Seals are provided on a sleeve that runs the length of the threaded member.

U.S. Pat. No. 3,175,473 to Boteler et al. shows a spring brake assembly with a push rod passing through two plates and an apertured diaphragm. A retaining nut is fastened at the top of the push rod to hold the plates and diaphragm against a shoulder of the push rod. The entire assembly moves together with the push rod.

U.S. Pat. No. 5,507,217 to Plantan concerns an arrangement utilizing both a center-hole parking diaphragm held together by a threaded member and radial sealing on the outer diameter of a shaft. The aperture includes sealing beads, and a bolt goes through the aperture into the push rod so that the diaphragm moves with the push rod. Two plates generally provide radial sealing around the diaphragm aperture.

U.S. Pat. No. 6,164,187 to Stojic shows an apertured diaphragm sealed with a multi-fingered sealing clip on the opposite side of a plate from a power spring.

U.S. Pat. No. 2,578,730 to Nicholson et al. relates to a fluid pressure seal with two diaphragms held between plates. A fastening device is threaded through the two diaphragms into the plates to hold the diaphragms in place.

U.S. Pat. No. 3,020,094 to Murty et al. shows a diaphragm on a power spring side sealed by a separate clamp along its outer edges.

U.S. Pat. No. 3,101,219 to Herrera shows two screws holding a diaphragm against a service brake plate.

U.S. Pat. No. 3,244,079 to Herrera discloses an apertured diaphragm held against a plate by screws, thereby avoiding bulging.

U.S. Pat. No. 3,581,627 to Campanini shows an apertured diaphragm, which is sealed around a push rod by way of a screw.

U.S. Pat. No. 3,656,410 to Trower concerns a distributor actuator with an apertured diaphragm. The diaphragm is held against a plate and a rod by a cup-shaped member.

U.S. Pat. No. 3,696,711 to Berg et al. shows a massive annular diaphragm for creating a movable wall between service and spring brake portions.

U.S. Pat. No. 5,105,727 to Bowyer shows an apertured diaphragm with a boss. The diaphragm is held between a pressure plate and a hollow member.

U.S. Pat. No. 5,345,858 to Pierce and U.S. Pat. No. 5,640,893 to Stojic show hollow actuator rods through spring brake portions against which apertured diaphragms are sealed.

U.S. Pat. No. 5,377,579 to Pierce shows a diaphragm sealed between a funnel-shaped pressure plate and a hollow rod.

U.S. Pat. No. 5,937,733 to Stojic shows a diaphragm with an aperture sealed by a pressure plate forming a frustoconical surface around the diaphragm and a rod.

U.S. Pat. No. 6,360,649 to Plantan discloses a diaphragm sealed around the outside edge of a power plate.

Finally, U.S. Patent application publication 2007/0034465 to Thompson et al. discloses a flexible bushing assembly for the center seal of a spring brake push rod.

Unless manufacturers are driven to reduce weight or dramatically improve durability, current methods of using heavier designs with shorter useful lives are generally deemed adequate. The present invention addresses such weight and durability issues. While the references noted generally discuss uses of apertured diaphragms in spring brake assemblies and methods of sealing diaphragms, there is no suggestion of a multi-fingered sealing device to seal a diaphragm axially.

SUMMARY OF THE INVENTION

According to the invention, in general terms, a spring brake assembly utilizing a diaphragm with an aperture includes a push rod that goes through the aperture, while the diaphragm is held against a conical washer or actuator plate by a particular securing device. The securing device is preferably multi-fingered, and is placed over an end of the push rod and the diaphragm on the parking brake side of the spring brake assembly. The conical washer or actuator plate defines a small diaphragm plate that, together with an o-ring seal, seals the diaphragm axially at the push rod from the brake de-actuation side of the assembly. A return spring is unnecessary because the diaphragm moves in conjunction with push rod movement.

A non-threaded procedure for joining together a center hole parking diaphragm, a clip, a shaft, and a washer is afforded by the present arrangement, and a structural member is established by the washer and shaft via an interference fit, which may incorporate the use of splines between the washer and shaft. The diaphragm and the washer are secured together by a retaining clip providing diaphragm centering and sealing of the diaphragm axially between the clip and the conical washer. A fabric protection air path for a diaphragm with a molded-in fabric is further provided. Connecting a rod to a parking diaphragm in the manner disclosed reduces internal losses by eliminating the need for a return spring, saving both cost and weight. Because a power spring no longer needs to overcome internal losses, moreover, the power spring can be lighter and still provide the same parking force for the unit. This results in an advantageous overall weight reduction.

In preferred embodiments of the invention, a brake actuator includes a plurality of actuator housing portions, a diaphragm seal, partially delimiting a parking brake de-actuation chamber, retained between adjacent portions of the housing, and a push rod operable to produce brake actuation upon depressurization of the parking brake de-actuation chamber. In the configurations described, the actuator is a type in which the push rod extends into and out of a service brake actuation chamber upon release of fluid pressure from the parking brake de-actuation chamber and supply of fluid pressure to the parking brake de-actuation chamber, respectively.

The push rod extends through the parking brake de-actuation chamber, and is provided with an end section protruding through a central aperture defined in the diaphragm seal. An element such as a spring clip is receivable over the push rod end section and securable in place. The clip serves to compress the diaphragm seal axially relative to the push rod against a seat carried by the push rod while permitting a radial inner edge of the diaphragm seal to remain spaced from an outer surface of the end section.

The spring clip preferably is provided with radially inwardly projecting tabs engageable with the outer surface of the push rod end section. In one embodiment of the invention, an annular front section of the spring clip compresses an annular section surrounding a radial inner seal edge axially against the seat carried by the push rod. In this arrangement, teeth are preferably provided on the outer surface of the end to lock the spring clip in any of a plurality of desired positions. In another embodiment, the spring clip includes legs projecting axially relative to the push rod, and the legs have surfaces that pass over an exterior surface of the diaphragm seal. In this arrangement, the legs compress an area of the diaphragm seal surrounding the radial inner edge axially against the seat carried by the push rod.

A process of securing the diaphragm seal to the push rod is also described.

Simple manufacture and assembly are provided. Attaching the adapter push rod permanently to the parking diaphragm eliminates the need for a return spring and reduces the complexity of a connection, facilitating manufacture and assembly procedures.

The seal established by the diaphragm helps to maintain air pressure in the parking chamber. When air escapes past a chamber seal while utilizing a diaphragm with molded-in fabric, the fabric is at risk of being degraded due to the radial sealing mechanism. This invention provides a fabric protection air path that alleviates potential molded-in fabric degradation. The diaphragm-to-shaft connection is non-threaded, and a seal is produced on the face of the diaphragm axially instead of radially on the outer diameter of the shaft or an additional sleeve. By way of the non-threaded feature, assembly of the diaphragm to the shaft is simplified.

As sealing is axial instead of radial, should pressure escape past the o-ring seal, a fabric protection air path is available. This feature protects a diaphragm seal with molded-in fabric from blistering. Diaphragms with radial sealing do not provide this protection and could undergo fabric degradation under similar circumstances.

The use of a conical washer provides centering of a center-hole diaphragm as well as sealing the parking chamber. A sealed structural member is created by way of an interference fit with splines or teeth on an adapter push rod.

A conical washer is pressed onto a shaft containing an o-ring, and may be aligned by way of a spline on either part. The shaft is intended to pass through a center-hole diaphragm without touching the inner diameter of the diaphragm center hole. A retaining clip is then pressed onto the diaphragm and the shaft, providing axial sealing. With this construction, a conventional threaded connection is replaced by a press-fit connection between the washer and the shaft. Sealing is axial instead of radial. Any molded-in fabric incorporated in the diaphragm seal is protected from degradation in the event of o-ring failure. As the present design is non-threaded, it does not require the addition of a sealing sleeve. A structural member is established via a press-fit, and the molded-in air path is protected from degradation in the event of an o-ring seal failure.

Lighter weight, lower cost products that last longer result from the present design. These advantages are sought throughout the industry.

DETAILED DESCRIPTION OF THE INVENTION

The present invention shares certain characteristics with the brake actuator arrangement forming the subject matter of commonly assigned U.S. Pat. No. 7,506,573 to Scheckelhoff et al., the entire disclosure of which is incorporated herein by reference as non-essential subject matter.

The brake actuator 10 has a service brake actuation chamber 12 and a parking or emergency brake de-actuation chamber 14, and includes a first, preferably cast metal or metal alloy housing portion 16, a second housing portion 18, and a third housing portion 20 disposed on a side of the first housing portion 16 opposite the second housing portion 18. The second housing portion 18 may be referred to as a "front" housing portion, as it is located closest to a vehicle brake to which the actuator 10 is to be connected. The third housing portion 20 correspondingly may be referred to as a "rear" housing portion, and the first housing portion 16 may be referred to as an "intermediate" housing portion. Thus, in FIG. 1, "front" is the direction toward the right side, and "rear" is the direction toward the left side.

Figure 1:
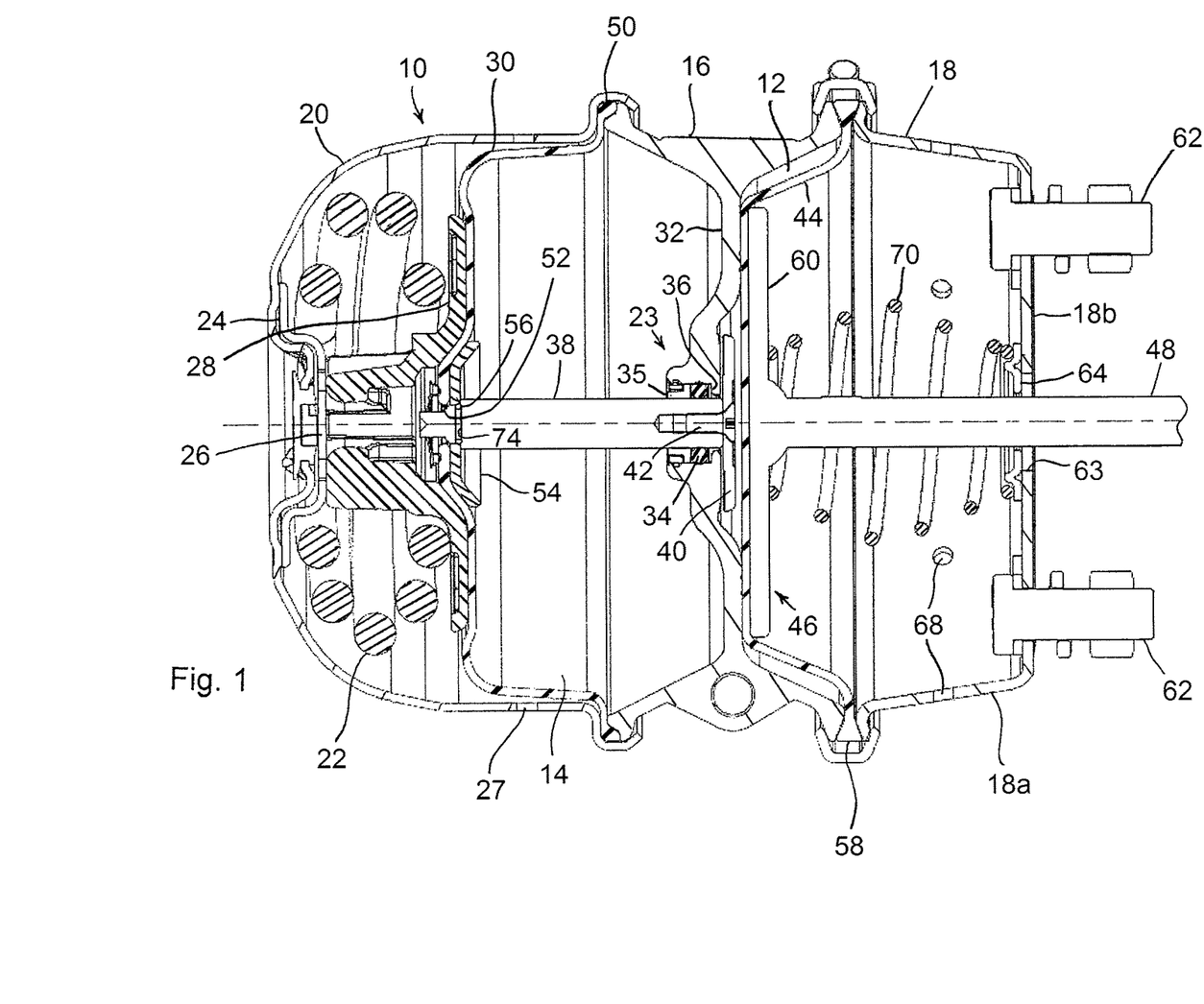
FIG. 1 is a sectional view of a brake actuator including a flexible diaphragm seal to adapter push rod connection according to the present invention.

Operating elements of the brake actuator 10 include a parking or emergency brake actuator spring 22, which has one end abutting a first spring seat 24 disposed within the third housing portion 20 around a central opening 26, and an opposite end resting on a rear-facing side of a second spring seat 28. A first flexible diaphragm seal 30 partially delimiting the parking or emergency brake de-actuation chamber 14 engages on a front-facing side of the second spring seat 28.

A seal arrangement 23 cooperates with a radially extending wall 32 of the first housing portion 16. As illustrated, the seal arrangement 23 includes an o-ring 34 pressed by a retaining collar 35 against a shoulder 36. The o-ring 34 extends circumferentially around a central aperture in the wall 32, so that the seal arrangement 23 cooperates with the outer surface of an adapter push rod 38, displaceable through the central aperture, to fluid-tightly separate the service brake actuation chamber 12 from the parking or emergency brake de-actuation chamber 14. Movement of the adapter push rod 38 through the central aperture in the wall 32 will occur upon release of fluid from the parking or emergency brake de-actuation chamber 14 as will be described. A ring or plate 40 serves as a force or pressure distributing element for a second flexible diaphragm seal 44 upon release of fluid from the parking or emergency brake de-actuation chamber 14. The ring or plate 40 is secured by a screw 42 or other such fastener to a front end of the adapter push rod 38. It is to be understood that the parking or emergency brake actuator spring 22 could be either a coil spring, as illustrated, or any other type of elastic member that provides the energy storage and return functions required by a parking brake actuator, such as multiple coil springs, leaf springs, cantilevered springs, resilient blocks, or chargeable high pressure bladders. Also included in the brake actuator 10 are a service brake apply actuator 46 and a brake actuator rod 48.

The radial outer circumference 50 of the first diaphragm seal 30 defines an outer edge that is clamped between adjacent ends or sections of the intermediate and rear housing portions 16, 20, while the radial inner edge 52 of the first diaphragm seal 30 is retained on an end of the adapter push rod 38 in a manner to be described. The brake de-actuation chamber 14 is thus defined within a volume delimited by the first housing portion 16, the first diaphragm seal 30, a conical washer 54 and an o-ring seal 56 (to be described), the seal arrangement 23, and the adapter push rod 38.

The brake de-actuation chamber 14 is shown in FIG. 1 in an operational condition, with the second spring seat 28 in a fully withdrawn position. This position is achieved when sufficient pneumatic pressure to overcome the spring force developed by the parking or emergency brake actuator spring 22 has been supplied, via a supply port (not illustrated), to the chamber 14. Opposite the brake de-actuation chamber 14, the third housing portion 20 is vented to atmosphere, for example by way of the openings 27.

The service brake apply actuator 46 in this embodiment includes the second diaphragm seal 44 attached at its outer circumference 58 between adjacent ends of the intermediate and front housing portions 16, 18. The actuator 46 additionally includes a supporting element 60, such as the illustrated plate or disc, disposed on the front side of the seal 44. The brake actuator rod 48 abuts against, is attached to, and/or is formed together with a central area of the supporting element 60.

The second housing portion 18 shown in FIG. 1 includes a substantially cylindrical portion 18a and a substantially radially extending forward end 18b. In the illustrated configuration, bolts 62 are provided to secure the forward end 18b to appropriate vehicle structure, although the overall brake actuator 10 could be attached to such structure in any other suitable manner. The forward end 18b has a central opening 63 within which the brake actuator rod 48 may reciprocate. A spring seat 64 is disposed on the interior surface of the end 18b adjacent an edge or edges of the central opening 63. Ventilation ports 68 are provided in the second housing portion 18 to permit fluid communication between the interior of the second housing portion and the atmosphere. A service brake return spring 70 is provided to bias the supporting element 60 away from the second housing portion end 18b and towards the third housing portion 20. This return spring 70 may be of any appropriate type but, in the embodiment illustrated, is formed by a compression coil spring extending, coaxially with the brake actuator rod 48, between a spring seat defined by the supporting element 60 and the spring seat 64.

It is apparent from FIG. 1 that the service brake actuation chamber 12 is defined within a volume delimited by the ring or plate 40, the screw 42, the wall 32, an inner circumferential surface of the intermediate housing portion 16, and the second flexible diaphragm seal 44. Actuation and release of a vehicle service brake can be effected, when the vehicle is running and the parking or emergency brake de-actuation chamber 14 is pressurized, by supplying air through an appropriate feed line to the service brake actuation chamber 12 and discharging the air supplied to the chamber 12, respectively. Increasing pressurization of the chamber 12 results in a force acting on the element 60, which overcomes the force applied by the return spring 70, thereby moving the brake actuator rod 48 in a brake application direction, i.e. to the right in FIG. 1. Decreasing pressurization of the chamber 12, of course, permits movement of the rod 48 and the element 60 in an opposite, service brake release direction, i.e. to the left in FIG. 1.

When a brake fluid supply system failure occurs, or when the vehicle is no longer running, the parking or emergency brake de-actuation chamber 14 is depressurized. A pressure loss in the chamber 14 permits the parking or emergency brake actuator spring 22 to expand, thereby displacing the second spring seat 28 toward the second housing portion 18, i.e. toward the front of the actuator 10. The spring seat 28 is seated on the first diaphragm seal 30, which, in turn, is seated on the conical washer 54 retained in position on the adapter push rod 38 by way of a shoulder 74. As the parking or emergency brake actuator spring 22 is stronger than the return spring 70, for example by having a force constant which is greater than that of the return spring 70, the push rod 38 is displaced through the aperture in the wall 32 receiving the seal arrangement 23 to the right in FIG. 1 and, in turn, displaces the element 60 and the brake actuator rod 48 in a brake application direction. Pressurizing the chamber 14 again, upon fluid supply system repair or when the vehicle is again running, displaces the push rod 38 in an opposite direction, compresses the spring 22, and discontinues parking or emergency brake application. During normal vehicle operation, the parking or emergency brake actuator spring 22 remains compressed, and service brake application and release is performed by respective pressurization of and relief of fluid pressure from the service brake actuation chamber 12.

A conventional caging bolt 76 (FIG. 2) is used in conjunction with a threaded nut (not shown) to retain the manual parking or emergency brake actuator spring 22 in a compressed condition during servicing or in other situations when the chamber 14 is de-pressurized.

Figure 2:
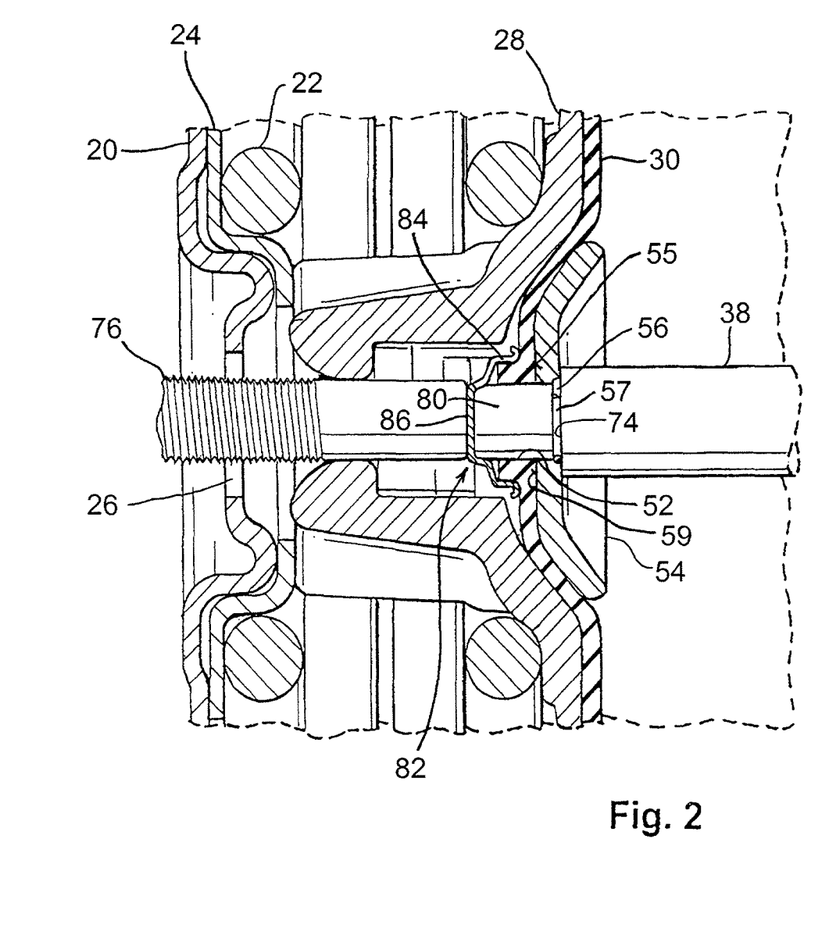
FIG. 2 is an enlarged view of a part of the brake actuator of FIG. 1 near one of the spring seats for the parking or emergency brake actuator spring using a clip according to one embodiment of the invention.

FIG. 2 shows an enlarged portion of an overall brake actuator similar to the actuator 10 of FIG. 1, and more clearly illustrates components of the actuator 10 adjacent to the interconnection of the radial inner edge 52 of the first diaphragm seal 30 and the rear end of the adapter push rod 38 according to a first arrangement. Prior to securing the first diaphragm seal 30 to the rear end of the push rod 38, in the FIG. 2 arrangement, the o-ring seal 56 and the conical washer 54 are placed over a reduced diameter end section 80 of the adapter push rod 38. If desired, the o-ring seal 56 may seat in a groove 57 extending circumferentially around the base of the end section 80 at its junction with the rest of the push rod 38. The push rod end section 80 is inserted through a central aperture defined by the radial inner edge 52 of the seal 30.

In the arrangement illustrated in FIG. 2, a toothed clip 82 defines an element receivable over the end section 80. Such a toothed clip 82 is shown by way of example as having multiple legs 84 extending from a central body 86. Clip 82 may be produced from spring steel. It will become apparent in connection with the discussion of FIGS. 3-5 that alternative clip constructions are possible and even preferable. Once the end section 80 is inserted through the central aperture as mentioned, the clip 82 is pressed axially with respect to the adapter push rod 38 toward the conical washer 54. As the clip 82 is pressed axially in this manner, interior surfaces of the legs 84 pass over an exterior surface of the first diaphragm seal 30 surrounding the radial inner edge 52 of the seal 30. Once the clip is pressed axially with respect to the push rod 38 to compress the first diaphragm seal 30 to a desired degree, the clip legs 84 operate to press and retain a front surface 55 of the first diaphragm seal 30 against a seat defined by a rear surface 59 of the conical washer 54. After the clip 82 has been axially pressed with respect to the push rod to the desired extent and the clip application force is released, the clip 82 is frictionally retained in position on the end section 80. Interior retention of the diaphragm seal 30 is provided by the engaging surfaces 55 and 59 of the seal 30 and the conical washer 54 only; the radial inner edge 52 of the seal 30, in fact, will be slightly displaced from the outer surface of the push rod end section 80. Axial compression of the front surface 55 of the first diaphragm seal 30 against the rear surface 59 of the conical washer 54, in other words, operates by itself to provide fluid tight sealing of the de-actuation chamber 14. Although not illustrated in FIG. 2, the clip 82 preferably includes radially inwardly extending spring tabs adapted to frictionally engage the circumferential outer surface of the adapter push rod end section 80 to retain the clip on that end section 80.

Figure 3:
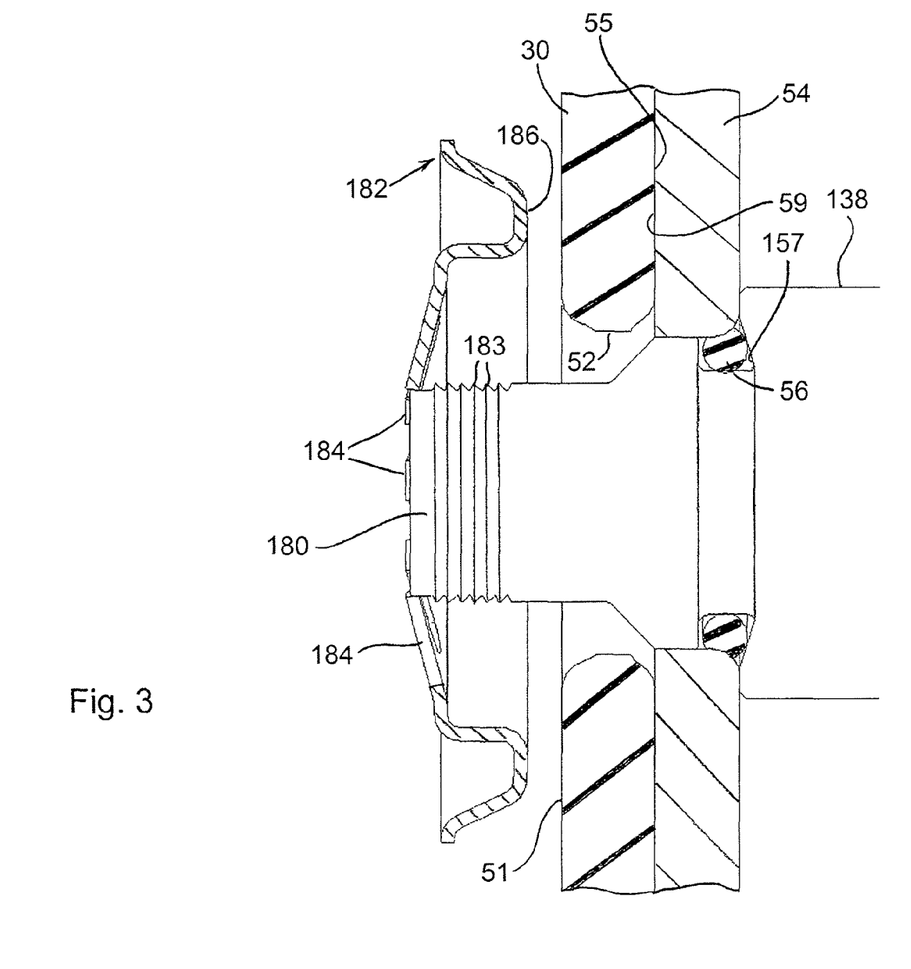
FIG. 3 illustrates the manner in which a clip having an alternative construction is assembled onto a push rod end section.
Figure 4:
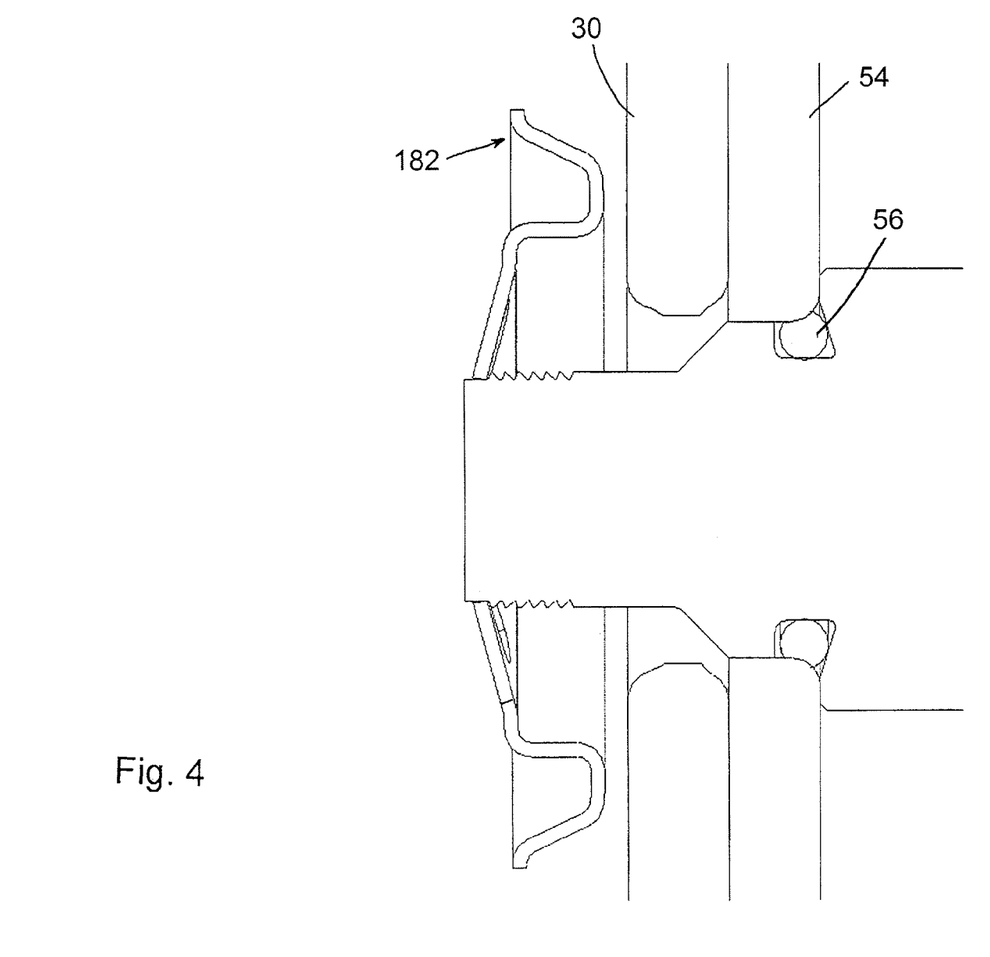
FIG. 4 is a highly schematic illustration similar to FIG. 3 showing the clip of FIG. 3 as it is being pressed into position.
Figure 5:
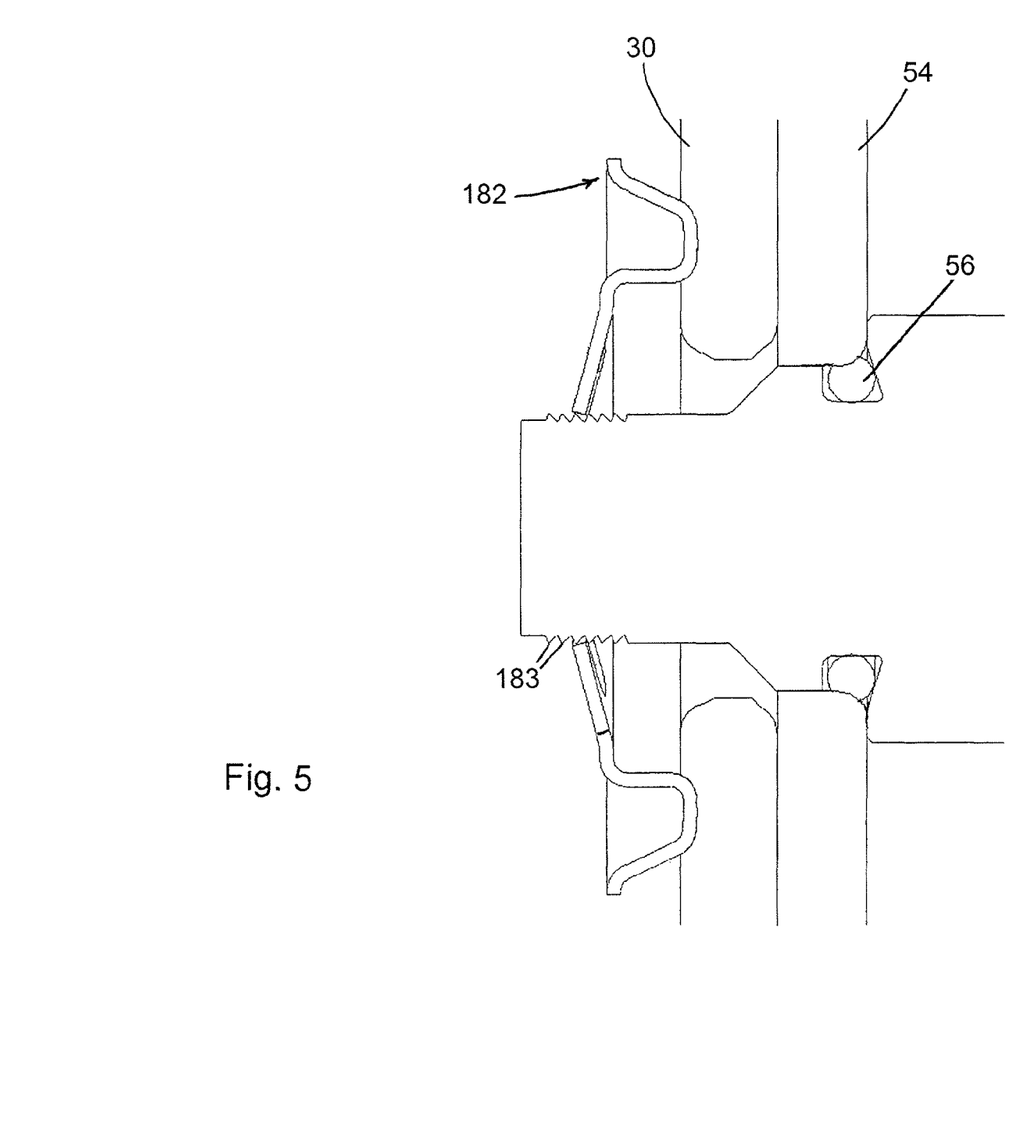
FIG. 5 is a view similar to FIG. 4 but showing the clip after proper positioning on the push rod end section.

The illustration provided by FIGS. 3 and the highly schematic illustrations provided by FIGS. 4-5 show the manner in which a clip 182, similar to the clip 82 described above but having one of the alternative constructions mentioned previously, defines an element that is assembled onto a push rod end section 180 of an adapter push rod 138. The flexible diaphragm seal 30, the conical washer 54, and the o-ring seal 56 shown in FIGS. 1 and 3-5 are in all essential aspects the same as the diaphragm seal, the washer, and the o-ring seal of FIG. 2, and are identified by the same reference numbers. Other elements shown in FIGS. 3-5 that are analogous to elements shown in FIG. 2 are indicated by numbers that differ by 100 from the elements shown in FIG. 2.

As in the arrangement shown in FIG. 2, the clip 182 is designed to axially compress a front surface 55 of the first diaphragm seal 30 against the rear surface 59 of the conical washer 54. The push rod end section 180 is shown with annular grooves 183 defined thereon that facilitate gripping between the clip 182 and the push rod end section 180 and that can also serve to assist in proper positioning of the clip 182 on the push rod end section. As before, prior to securing the first diaphragm seal 30 to the rear end of the push rod 138, the o-ring seal 56 and the conical washer 54 are placed over the reduced diameter end section 180. The o-ring seal 56, again, may seat in a groove 157 extending circumferentially around the base of the end section 180 at its junction with the rest of the push rod 138. The push rod end section 180 is also inserted through a central aperture defined by the radial inner edge 52 of the seal 30.

By way of example only, the clip 182 is shown in FIGS. 3-5 as having eight axially and radially inwardly extending tabs 184. Other numbers of tabs 184 could be used, of course. Once the end section 180 is inserted through the central aperture of the seal 30 as mentioned, the clip 182 is preassembled on the reduced diameter end section 180, as shown in FIG. 3, and then pressed axially as shown in FIG. 4 with respect to the adapter push rod 138 toward the conical washer 54. As the clip 182 is pressed further axially in this manner, interior ends of the tabs 184 pass over the teeth defined by the annular grooves 183 on the exterior of the push rod end section 180, as shown in FIG. 5. Once the clip is pressed axially with respect to the push rod 138 to compress the first diaphragm seal 30 to a desired degree, the protruding front annular surface 186 of the clip 182 engages the rear surface 51 of the seal 30, and thus operates to press and retain the front surface 55 of the first diaphragm seal 30 against the rear surface 59 of the conical washer 54. After the clip has been axially pressed with respect to the push rod, over a number of teeth between the grooves 183, to a desired compression and into the proper position and the clip application force is released, sealing is provided by the engaging surfaces of the seal 30 and the conical washer 54 only; again, the radial inner edge 52 of the seal 30 will be slightly displaced from the outer surface of the push rod end section 180. Referring to FIG. 5, in the illustrated example, the clip 182 is considered to be properly positioned based on a calculated compression.

Although such is not shown in the drawings, diaphragm seals such as the seal 30 typically have layered constructions, with a central layer of reinforcing fabric sandwiched between a pair of rubber layers. During production, the central aperture of a seal 30, defined by the radial inner edge 52, is commonly formed by a stamping process, which leaves adjacent edges of the central layer of reinforcing fabric and the pair of rubber layers exposed. By having the radial inner edge 52 of the seal 30 slightly displaced from the outer surface of the push rod end section 80 (FIG. 2) or 180 (FIGS. 3-5) while the brake actuator 10 operates, pressure build-up between the push rod and the diaphragm inner edge can be minimized. Frictional delamination of the reinforcing fabric and rubber layers, and the resulting potential intrusion of air in the event of a leak past either the o-ring seal 56 or between surfaces 55 and 59, between such delaminated layers, can be avoided as well. Any air leaking from the chamber 14, instead, will readily pass through the space defined between the radial inner edge 52 and the outer surface of the push rod end section, between the legs 84 (FIG. 2) or tabs 184 (FIGS. 3-5), and out of the actuator 10.

It is possible that arrangements in which the shaft is threaded or welded to the washer could be designed. Sealing of the parking chamber could also possibly be accomplished by the inner diameter of the parking diaphragm against the shaft.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A brake actuator comprising:
    a plurality of actuator housing portions,
    a diaphragm seal, partially delimiting a parking brake de-actuation chamber, retained between adjacent housing portions of the plurality of actuator housing portions,
    a push rod operable to produce brake actuation upon depressurization of the parking brake de-actuation chamber, the push rod extending through the parking brake de-actuation chamber and including an end section protruding through a central aperture defined in the diaphragm seal, and
    an element receivable over said end section of the push rod and securable on said end section to compress the diaphragm seal axially relative to the push rod against a seat carried by the push rod while permitting a radial inner edge of the diaphragm seal to remain spaced from an outer surface of said end section.

2. The brake actuator according to claim 1, wherein the element is a spring clip including radially inwardly projecting tabs engageable with said outer surface of said end section.

3. The brake actuator according to claim 2, wherein an annular front section of said spring clip compresses an annular section of the diaphragm seal surrounding said radial inner edge axially against said seat carried by the push rod.

4. The brake actuator according to claim 2, wherein the outer surface of said end section includes grooves adapted to lock the spring clip in any of a plurality of desired positions relative to said end section.

5. The brake actuator according to claim 2, wherein the push rod extends into and out of a service brake actuation chamber upon release of fluid pressure from said parking brake de-actuation chamber and supply of fluid pressure to said parking brake de-actuation chamber, respectively.

6. The brake actuator according to claim 1, wherein said seat carried by the push rod is defined by a washer secured to the push rod.

7. The brake actuator according to claim 6, wherein said washer is retained in position on the push rod by abutting a shoulder on said push rod.

8. The brake actuator according to claim 7, further comprising a seal interposed between the washer and the push rod to preclude leakage of fluid past the washer.

9. The brake actuator according to claim 1, wherein the element has an annular front section that compresses an annular section of the diaphragm seal surrounding said radial inner edge axially against said seat carried by the push rod.

10. The brake actuator according to claim 9, wherein the push rod extends into and out of a service brake actuation chamber upon release of fluid pressure from said parking brake de-actuation chamber and supply of fluid pressure to said parking brake de-actuation chamber, respectively.

11. The brake actuator according to claim 1, wherein the push rod extends into and out of a service brake actuation chamber upon release of fluid pressure from said parking brake de-actuation chamber and supply of fluid pressure to said parking brake de-actuation chamber, respectively.

12. The brake actuator according to claim 1, wherein the element is a clip that frictionally engages an outer surface of said end section.

13. A process of securing a diaphragm seal, adapted to partially delimit a parking brake de-actuation chamber and retained between adjacent housing portions of a plurality of brake actuator housing portions, to a push rod that is operable to produce brake actuation upon depressurization of the parking brake de-actuation chamber and that extends through the parking brake de-actuation chamber, comprising:
  inserting an end section of the push rod through a central aperture defined in said diaphragm seal,
  placing an element over said end section of the push rod,
  pressing the element on said end section to compress the diaphragm seal axially relative to the push rod against a seat carried by the push rod, and
  securing the element in place on said end section to maintain compression of the diaphragm seal axially while permitting a radial inner edge of the diaphragm seal to remain spaced from an outer surface of said end section.

14. The process according to claim 13, wherein the element is a spring clip including radially inwardly projecting tabs engageable with said outer surface of said end section.

15. The process according to claim 14, wherein an annular front section of said spring clip compresses an annular section of the diaphragm seal surrounding said radial inner edge axially against said seat carried by the push rod.

16. The process according to claim 14, wherein the outer surface of said end section includes grooves adapted to lock the spring clip in any of a plurality of desired positions relative to said end section.

17. The process according to claim 13, wherein said seat carried by the push rod is defined by a washer secured to the push rod.

18. The process according to claim 13, wherein the element has an annular front section that compresses an annular section of the diaphragm seal surrounding said radial inner edge axially against said seat carried by the push rod.

19. The process according to claim 13, wherein the push rod extends into and out of a service brake actuation chamber upon release of fluid pressure from said parking brake de-actuation chamber and supply of fluid pressure to said parking brake de-actuation chamber, respectively.

20. The process according to claim 13, wherein the element is a clip that frictionally engages an outer surface of said end section.

* * * * *